Figure 1:
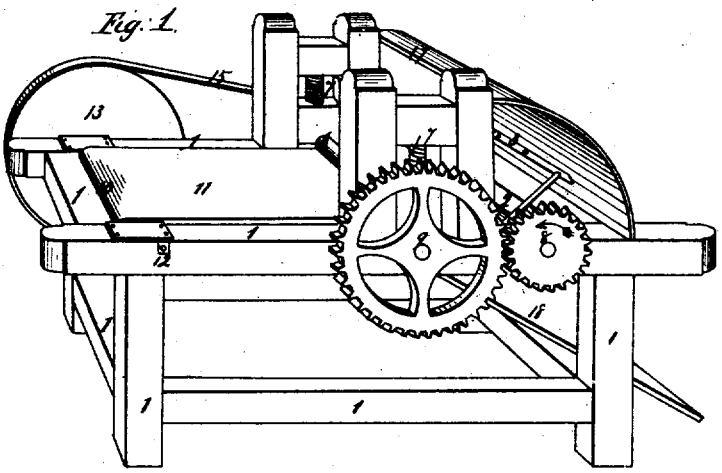
Figure 2:
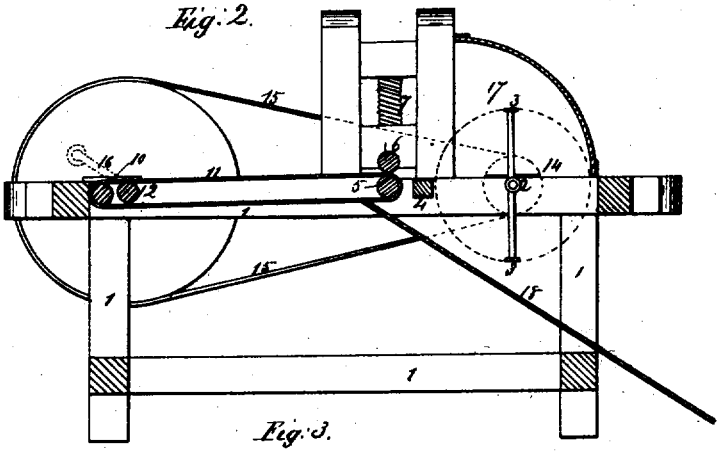
Figure 3:
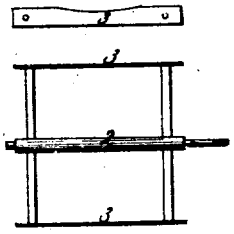

8070X

J. S. BISHOP.

Straw Cutter.

Patented Mar. 12, 1834.

THE NORRIS PETERS CO., PHOTO-LITHO., WASHINGTON, D. C.

Mar. 12. 1834 121

Joseph S. Bishop, a Citizen of the United States

8070X

Letters Patent

The Schedule referred to in these Letters Patent and making a part of the same, containing a description in the words of the said Joseph S. Bishop himself of his improvement in the Machine for Cutting Hay and Straw To all to whom these presents shall come; Be it known that I - Joseph S. Bishop of Wayne County of Kennebec and State of Maine, Sadler, have invented a new and useful improvement in Hay and Straw Cutters, and that the following is a full and exact description of the construction and operation of said Machine as invented or improved by me; In making this frame, I take some Joist about four inches square, and form a frame about six feet long more or less, and two feet wide more or less, and three feet high, this is No (1) in the drawing on this frame about one foot and a half from the end, I place a shaft across this frame No (2) This shaft is confined down to the frame No (1.) and runs on boxes, I next, place two, or more knives forming a square on the shaft No (2.) and are confined, these knives are No (3.) I next place a bar of iron across the frame just so the knives will pass clear from this bar of iron, this bar is confined to the frame No (1.) this bar is No (4.) I next place back of this bar of iron two rollers three inches through them one over the other, and the under one is confined to the frame No (1.) and runs on boxes in the under roller. I place in each end one gudgeon, and also one in each end of the upper roller; and the upper roller rises and falls according to the feeding of the Machine, these rollers are No (5.) and (6.) at each end of the upper roller I place a Spring to govern the feed, these Springs are No (7.) on the end of the shaft No (2.) I place a cog wheel about three inches in diameter more or less, this wheel is No (8) in the next place on the end Drawing & no model

8070X.

of the gudgeon No.(5.) I place another wheel about twelve inches more or less, this wheel is No.(9.) and mashes into the wheel (8) in the next place I place another roller in the end of this frame No.(1.) this Roller is No.(10) I next place an apron round the roller No.(5.) and (10) this apron is No.(11) I next place a shaft across this frame No.(1) this shaft is confined down to the frame and runs in boxes, this shaft is No.(12) on the end of this shaft I place a wheel, about four feet in diameter, this wheel is No.(13.) I next place on the end of this shaft No.(2.) a wheel four inches in diameter, this is No.(14) I next place on the wheels No.(13) and (14) a band around them, this is No.(15.) I next place on the end of the shaft No.(12) a Crank, this crank is No.(16) I next place a box over these knives to prevent danger, this box is confined to the frame No.(1.) this is No.(17) I next place a box under these knives, to carry the hay and straw from the frame No.(1) this box is No.(18.) The way and manner of using this Machine is as follows (viz) in the first place I have a man to feed this Machine, I next take hold of the Crank No.(16) it moves the wheel No.(13.) it moves the band No.(15.) the band moves the wheel No.(14) the shaft No.(2) the knives three or No.(3) the Wheel No.(8.) also moves the wheel No.(9) it moves the roller No.(5) the Roller No.(10) the apron No.(11) the Hay or straw moves between the Rollers (5) and (6) it passes over the bar of Iron No.(4) the knives No.(3) turns over and cuts hay or straw off and it passes off in the box No.(18). As to the above described Machine, I in the first place claim the form and arrangement of the knives, also the construction of the wheels to govern the hay or straw, which I can cut from one quarter of an inch to three inches or more, and also all the arrangement of the above described Machine, and also any power that may be applied.

Witnesses
Thomas W. Bridgham
Giddings Lane Jr.

Joseph S. Bishop

Exd
[illegible]

[illegible]